June 9, 1964 A. SOULIER 3,136,174
ELECTROMECHANICAL EQUIPMENT FOR CONTROLLING THE
RUNNING OF AN ELECTRIC VEHICLE
Filed June 30, 1961 2 Sheets-Sheet 1

INVENTOR
ANDRÉ SOULIER
BY Craig and Freudenberg
ATTORNEYS

United States Patent Office 3,136,174
Patented June 9, 1964

3,136,174
ELECTROMECHANICAL EQUIPMENT FOR CON-
TROLLING THE RUNNING OF AN ELECTRIC
VEHICLE
André Soulier, Cachan, France, assignor to Societe Sovel,
Vehicules Electriques Industries, Villeurbanne, Rhone,
France, a French corporation
Filed June 30, 1961, Ser. No. 121,136
Claims priority, application France July 11, 1960
7 Claims. (Cl. 74—472)

In the majority of electric vehicles, the motor or motors are positively connected to the driving wheels and the running control, that is to say, starting, acceleration and speed variation, is effected by means of an appropriate electric apparatus controlling the feed or energization of the motor and its exciting field.

Since very large variations of torque and speed must be obtained in order to satisfy widely varying running conditions, more especially by reason of the differences in road contour, the motor must be adapted to operate with widely varying outputs and to meet considerable load increases as compared with conditions corresponding to normal running of the vehicle along a flat road.

Moreover, these considerable torques which the motor must be able to develop in order to be able to climb steep gradients must be applied during starting and acceleration to the transmission, which is frequently and suddenly subjected to very considerable torques which may reach such an extent that the driving wheels slip, which causes unnecessary fatigue on the mechanical parts.

Thus, this control system, which is generally employed, involves the use of a motor having very wide characteristics with fairly complicated equipment and a transmission which is capable of continuously resisting the slipping torque, which three conditions involve heavy and costly constructions.

Another solution which has sometimes been employed in the electrification of heat engine vehicles consists in replacing the petrol or gas-oil engine by an electric motor, while retaining the clutch and the gearbox.

By this arrangement, it is possible with certain precautions to avoid the aforesaid disadvantages, but it has the disadvantage of operating the electric motor as a petrol engine and causing it to run idly and at reduced speed when the motor is declutched, which condition is uneconomic and, above all, difficult to realize.

The present invention has for its object to provide electric traction equipment which is not attended by the aforesaid disadvantages, and it is proposed in accordance therewith to cut off automatically the supply to the motor during speed-changing operations, and to ensure rational use of this speed change by a current limitation.

The invention concerns electromechanical equipment for controlling the running of an electric vehicle comprising storage batteries and a motor, which is characterised in that a multi-speed gearbox is disposed directly without a clutch between the motor and the driving wheels, with a gear change lever and a pedal or hand lever for controlling the supply or energization of the motor, having a number of corresponding positions, including the neutral currentless position, and a control relay for automatically switching on and off the supply current during the engagement of a gear and the return to neutral, respectively.

The manner in which the invention can be put into practice in detail will hereinafter be explained with reference to the accompanying drawings illustrating a number of non-limiting embodiments.

Figure 1:
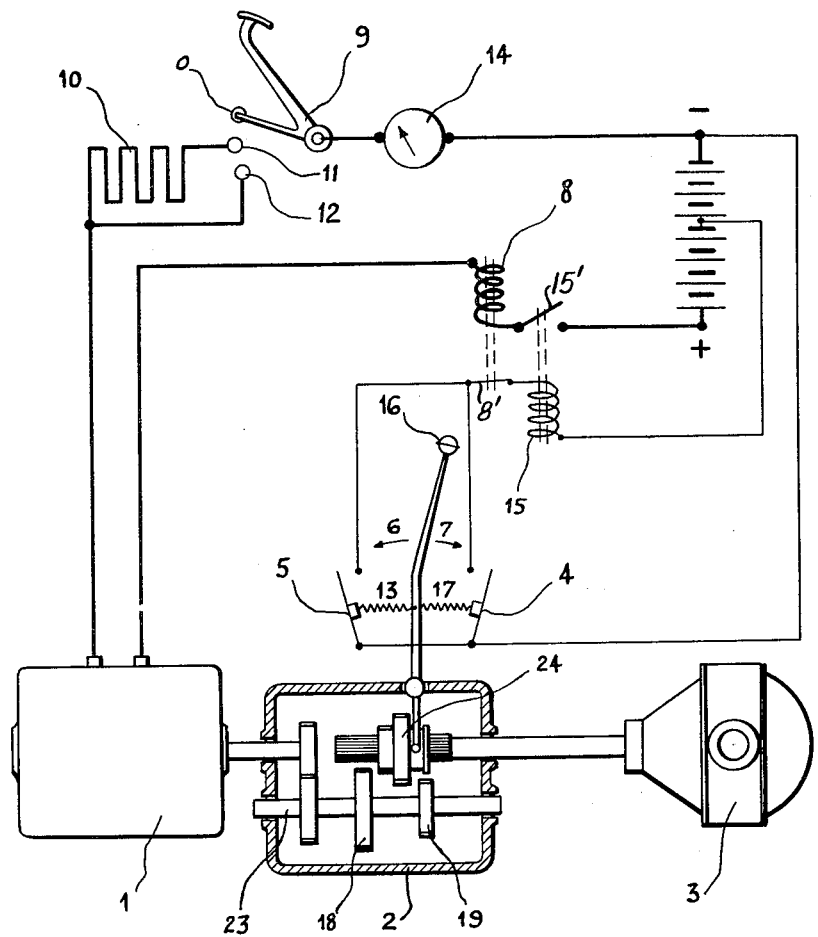
FIGURE 1 is a general diagram of an electromechanical control equipment according to the invention.

As illustrated in FIGURE 1, an electric motor 1 may drive, through a gearbox 2, the live axle 3 and therewith the driving wheels.

A three-position pedal 9 controls the supply or energization of the motor 1 by the storage battery, with:

a position 0 in which the circuit is broken
an intermediate position 11 with resistance 10 in series
a position 12 for normal running without resistance.

An auxiliary circuit shown in thin lines, which is connected to a fraction of the battery, feeds or energizes the winding of the line control relay 15 through contacts 5 and 4 operated in dependence upon the position of the gear change lever 16. A maximum relay 8 in this circuit can break the secondary or auxiliary circuit in the event of a current overload.

The equipment is completed by an ammeter 14 in the main circuit.

The equipment operates as follows: In the neutral position, as illustrated in FIGURE 1, the sliding mesh gear 24 is free or disengaged, the lever 16 is in the mid-position, the contacts 4 and 5 are open, the winding of control relay 15 remains unenergized and the main circuit is open as a result of the open contact 15'.

When the driver moves his gear lever 16 in the direction of the arrow 7, it carries along the sliding gear 24, which engages the pinion 18 of the lay shaft, the motor 1 is connected to the live axle 3, while at the same time the contact 5 actuated by the gear lever 16 through the spring 13 closes, the coil of the control relay 15 is energized and the corresponding contact 15' thereof is closed in the main circuit.

It is sufficient to depress the pedal 9 in order to cause the supplying or energization of the motor and the starting of the vehicle. In order to change gear, the driver must necessarily release his accelerator pedal 9, which returns to the position 0, and the contact is then opened and there is no further driving pressure on the teeth of the meshing gears, so that the lever 16 can be moved in the direction of arrow 6 without difficulty, the sliding gear engages the pinion 19, the contact 4 is closed and consequently the coil or winding of control relay 15 is again energized.

On depression of the pedal 9, the driving action of the motor is restored.

If the current is too high, the maximum relay 8 interrupts, by opening of its contact 8', the energization of the coil of the control relay 15 and consequently that of the motor. The driver, who has been warned by the readings of the ammeter 14, must change to a lower gear.

Figure 2:
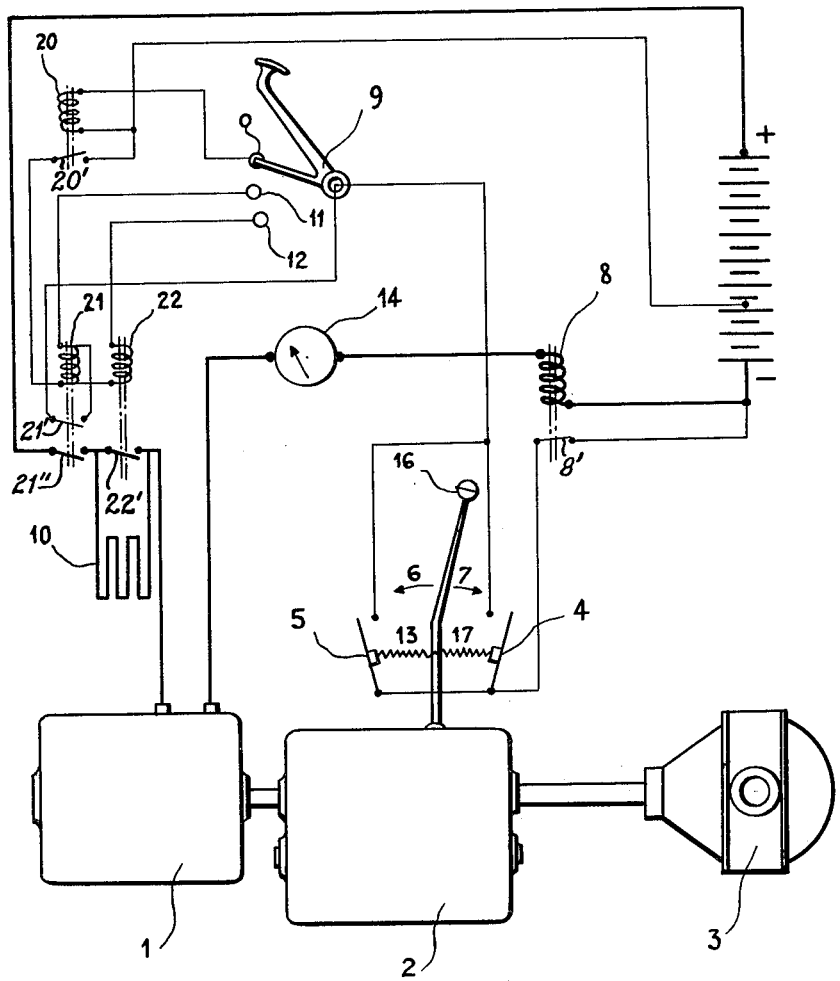
FIGURE 2 is a variant of this diagram ensuring more reliable electrical operation of the control equipment.

As illustrated in FIGURE 2, the general arrangement is the same, as indicated by the corresponding common reference numerals, but the direct-action pedal of FIGURE 1 is replaced by a pedal 9 controlling the energization of the windings of control relays.

The operation is as follows:

In the neutral position as illustrated in FIGURE 2, the lever is in the mid-position, the contacts 4 and 5 are open and the pedal 9 remains disconnected from the voltage source as a result of the open contacts 4 and 5. When the driver moves his gear lever 16 in the direction of the arrow 7, he engages a gear as in the case of FIGURE 1, while at the same time the contact 5 actuated by the lever 16 through the spring 13 closes, the pedal energizes, through the contact 0, the control relay winding 20, which is a relay cutting off the energization or supply of the control relay winding 21, and the contact 20' opens.

When the driver changes the position of foot pedal 9 to engage terminal 11, the control relay winding 21 is energized, its two contacts 21' and 21" close, the motor 1 is energized through the resistance 10, the motor starts to operate and the control relay winding 21 remains energized through its hold relay 21". When the driver changes the foot pedal 9 to engage the terminal 12, the coil 21 remains energised, but the control relay winding 22 is also energised and its contact 22' short-circuits the resistance 10, the motor then being directly connected to the battery.

When the driver releases the pedal either in order to slow down or in order to change gear, it returns to the position 0, and the control relay winding 20 is then energised and its contact 20' opens and interrupts the energization of the control relay winding 21, the control relay winding 22 being already de-energized and its contact 22' being open, so that the circuit of the motor is broken.

If the current is too high, the maximum relay 8, by means of its contact 8' which is opened, breaks the circuit of the control relays 20, 21 and/or 22 and consequently the main circuit of the motor, and the driver, who has already been warned by the readings of the ammeter, must change to a lower gear.

This construction of the equipment has the advantage that it uses a small foot-controlled controller which interrupts only the magnetic energizing circuits of the control relays, which does not give rise to any difficulty in construction. The control relays employed are 100-A contactors which, with their magnetic blowing action, can interrupt currents of several hundreds of amperes without difficulty.

I claim:

1. An electromechanical equipment for controlling the operation of an electric vehicle having an electric motor operable to drive the wheel drive means for the wheels of the vehicle, storage battery means, and connecting means operatively connecting said storage battery means with said electric motor, comprising change-speed gear means operatively connected directly between the motor and the drive means and including actuating means having a neutral position and a plurality of speed engaging positions for selectively engaging the speeds thereof, manual means in said connecting means for selectively controlling the energization of the motor, said manual means having a plurality of positions including a neutral currentless position in which said motor is effectively disconnected from said storage battery means, and control means operatively connected with said actuating means for automatically closing said connecting means to thereby selectively switch on the current circuit of the motor upon engagement of a speed by said actuating means and for automatically opening said connecting means independently of the position of said manual means to thereby switch off the current circuit of the motor upon return of said actuating means to said neutral position.

2. An electromechanical equipment for controlling the operation of an electric vehicle having an electric motor operable to drive the driving means for the wheel drive means for the wheels of the vehicle, storage battery means, and connecting means operatively connecting said storage battery means with said electric motor, comprising change-speed gear means directly connected between the motor and the driving wheels and including actuating means having a neutral position and a plurality of speed engaging positions for selectively engaging the speeds thereof, overload relay means operatively associated with said connecting means and operable to effectively open said connecting means in case of excesssively high supply currents, manual means in said connecting means for selectively controlling the energization of the motor, said manual means having a plurality of positions including a neutral currentless position in which said motor is effectively disconnected from said storage battery means, and control means operatively connected with said actuating means for automatically closing said connecting means to thereby selectively switch on the current circuit of the motor upon engagement of a speed by said actuating means and for automatically opening said connecting means independently of the position of said manual means to thereby switch off the current circuit of the motor upon return of said actuating means to said neutral position.

3. An electromechanical equipment for controlling the operation of an electric vehicle having an electric motor operable to drive the driving means for the wheel drive means for the wheels of the vehicle, storage battery means, and connecting means operatively connecting said storage battery means with said electric motor, comprising change-speed gear means directly connected between the motor and the driving means and including actuating means having a neutral position and a plurality of speed engaging positions for selectively engaging the speeds thereof, manual means in said connecting means for selectively controlling the energization of the motor, said manual means having a plurality of positions including a neutral currentless position in which said motor is effectively disconnected from said storage battery means, and control means for automatically and effectively closing said connecting means to thereby selectively switch on the current circuit of the motor upon engagement of a speed and opening said connecting means independently of the position of said manual means to thereby switch off the current circuit of the motor upon return of said actuating means to said neutral position, said control means including, for each gear, an electric contact selectively closed and opened by said actuating means during engagement of a respective gear and disengagement thereof, respectively.

4. An electromechanical equipment for controlling the operation of an electric vehicle having an electric motor operable to drive the driving means for the wheel drive means for the wheels of the vehicle, storage battery means, and connecting means operatively connecting said storage battery means with said electric motor, comprising change-speed gear means directly connected between the motor and the driving means and including actuating means having a neutral position and a plurality of speed engaging positions for selectively engaging the speeds thereof, manual means in said connecting means for selectively controlling the energization of the motor, said manual means having a plurality of positions including a neutral currentless position in which said motor is effectively disconnected from said storage battery means, said actuating means being operable to deenergize said motor in the neutral position thereof, and control means operatively connected with said actuating means for automatically closing said connecting means to thereby selectively switch on the current circuit of the motor upon engagement of a speed by said actuating means and for automatically opening said connecting means independently of the position of said manual means to thereby switch off the current circuit of the motor upon return of said actuating means to said neutral position.

5. An electromechanical equipment for controlling the operation of an electric vehicle having an electric motor operable to drive the driving means for the wheel drive means for the wheels of the vehicle, storage battery means, and connecting means operatively connecting said storage battery means with said electric motor, comprising change-speed gear means directly connected between the motor and the driving wheels and including actuating means having a neutral position and a plurality of speed engaging positions for selectively engaging the speeds thereof, manual means in said connecting means for selectively controlling the energization of the motor, said manual means having a plurality of positions including a neutral currentless position in which said motor is effectively disconnected from said storage battery means, and control means for automatically closing said connecting means to thereby selectively switch on the current circuit of the motor upon engagement of a speed by said actuating means and for automatically opening said connecting means independently of the position of said manual means to thereby switch off the current circuit of the motor upon return of said actuating means to said neutral position, said control means including relay means operable to automatically switch on and off the current for each gear and further relay means for controlling said first-mentioned relay means, said further relay means being energized with said manual means in the neutral position and said actuating means in a speed engaging position.

6. In an electric vehicle having an electric motor operable to drive the driving means for the wheels of the vehicle, voltage source means, and connecting means operatively connecting said voltage source means with said electric motor, the improvement essentially consisting of an electromechanical equipment for controlling the operation of the vehicle, comprising change-speed gear means directly connected between the motor and the driving means, actuating means for selectively engaging the speeds of said change-speed gear means, regulating means in said connecting means for selectively controlling the energization of the motor, said regulating means having a plurality of positions including a neutral currentless position in which said connecting means is effectively opened, and control means operative in dependence on the position of said actuating means for automatically closing and opening said connecting means to thereby selectively switch on and off the current supply for the motor, respectively, upon engagement of a gear and return to neutral, respectively, independently of the position of said regulating means.

7. In an electric vehicle having an electric motor operable to drive the driving means for the wheels of the vehicle, storage battery means, and circuit means operatively connecting said storage battery means with said electric motor, the improvement essentially consisting of an electromechanical equipment for controlling the operation of the vehicle, comprising change-speed gear means directly connected between the motor and the driving means, a lever for selectively engaging the gears of said change-speed gear means, a pedal in said circuit means for selectively controlling the supply of current to the motor, said pedal having several positions including a neutral currentless position in which the motor is de-energized, and control means including contact means operative in dependence on the position of said lever for automatically closing said circuit means to thereby selectively switch on the current supply for the motor only upon engagement of a gear by said actuating means while opening said circuit means in all other positions of said lever including the neutral position of said change-speed gear means independently of the position of said pedal.

References Cited in the file of this patent
UNITED STATES PATENTS

| | | |
|---|---|---|
| 963,138 | Golden et al. | July 5, 1910 |
| 1,527,247 | Bouillon | Feb. 24, 1925 |
| 3,064,492 | Stram | Nov. 20, 1962 |